United States Patent
Henry

(10) Patent No.: US 10,109,275 B2
(45) Date of Patent: Oct. 23, 2018

(54) WORD HASH LANGUAGE MODEL

(71) Applicant: ASAPP, INC, New York, NY (US)

(72) Inventor: Shawn Henry, Brooklyn, NY (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 15/383,707

(22) Filed: Dec. 19, 2016

(65) Prior Publication Data

US 2018/0174579 A1 Jun. 21, 2018

(51) Int. Cl.
*G10L 15/28* (2013.01)
*G10L 15/197* (2013.01)
(Continued)

(52) U.S. Cl.
CPC .......... *G10L 15/197* (2013.01); *G06F 17/274* (2013.01); *G10L 15/14* (2013.01);
(Continued)

(58) Field of Classification Search
CPC ............ G06F 17/2217; G06F 17/2735; G06F 17/274; G06F 17/2795; G06F 17/2872; G06F 17/289; G06F 19/22; G06F 19/24; G06F 7/02; H04L 9/3236; H04L 2209/04; H04L 63/0435; H04L 63/12; H04L 63/1416; H04L 63/1441; H04L 9/0637; H04L 9/0643; H04L 9/3241; G10L 15/22; G10L 15/14; G10L 15/148
(Continued)

(56) References Cited

U.S. PATENT DOCUMENTS 5,195,034 A * 3/1993 Garneau ............. G06F 17/2217
704/8
5,227,971 A * 7/1993 Nakajima ........... G06F 17/2735
704/2
(Continued)

FOREIGN PATENT DOCUMENTS

WO 2018009231 A1 1/2018
WO 2018009432 A1 1/2018

OTHER PUBLICATIONS

"scikit-learn: Machine Learning in Python", scikit-learn 0.17.1 documentation, http://scikit-learn.org/stable/ (accessed on Sep. 20, 2016), 3 pages.
(Continued)

*Primary Examiner* — Vijay B Chawan
(74) *Attorney, Agent, or Firm* — GTC Law Group PC & Affiliates

(57) ABSTRACT

A language model may be used in a variety of natural language processing tasks, such as speech recognition, machine translation, sentence completion, part-of-speech tagging, parsing, handwriting recognition, or information retrieval. A natural language processing task may use a vocabulary of words, and a word hash vector may be created for each word in the vocabulary. A sequence of input words may be received, and a hash vector may be obtained for each word in the sequence. A language model may process the hash vectors for the sequence of input words to generate an output hash vector that describes words that are likely to follow the sequence of input words. One or words may then be selected using the output word hash vector and used for a natural language processing task.

20 Claims, 7 Drawing Sheets

(51) Int. Cl.
*G10L 15/16* (2006.01)
*G10L 15/14* (2006.01)
*G10L 15/30* (2013.01)
*G06F 17/27* (2006.01)
*G10L 15/22* (2006.01)
*G06F 17/28* (2006.01)

(52) U.S. Cl.
CPC .............. *G10L 15/16* (2013.01); *G10L 15/22* (2013.01); *G10L 15/30* (2013.01); *G06F 17/289* (2013.01); *G10L 15/148* (2013.01)

(58) Field of Classification Search
USPC ............................... 704/1–10, 251, 255, 256
See application file for complete search history.

(56) References Cited

U.S. PATENT DOCUMENTS

| | | | |
|---|---|---|---|
| 5,369,575 A * | 11/1994 | Lamberti | G06F 17/274 704/9 |
| 6,173,279 B1 | 1/2001 | Levin et al. | |
| 6,381,645 B1 | 4/2002 | Sassin et al. | |
| 6,453,292 B2 * | 9/2002 | Ramaswamy | G10L 15/22 704/235 |
| 6,915,254 B1 | 7/2005 | Heinze et al. | |
| 6,981,040 B1 | 12/2005 | Konig et al. | |
| 7,644,057 B2 | 1/2010 | Nelken et al. | |
| 8,156,138 B2 | 4/2012 | Kohn et al. | |
| 8,271,403 B2 * | 9/2012 | Rieck | G06F 7/02 706/12 |
| 8,577,671 B1 | 11/2013 | Barve et al. | |
| 8,626,509 B2 | 1/2014 | Roy et al. | |
| 9,336,269 B1 | 5/2016 | Smith et al. | |
| 9,715,496 B1 | 7/2017 | Sapoznik et al. | |
| 9,805,371 B1 | 10/2017 | Sapoznik et al. | |
| 9,807,037 B1 | 10/2017 | Sapoznik et al. | |
| 2003/0033288 A1 | 2/2003 | Shanahan et al. | |
| 2005/0105712 A1 | 5/2005 | Williams et al. | |
| 2005/0228790 A1 | 10/2005 | Ronnewinkel et al. | |
| 2006/0112127 A1 | 5/2006 | Krause et al. | |
| 2006/0173776 A1 | 8/2006 | Shalley et al. | |
| 2007/0094217 A1 | 4/2007 | Ronnewinkel et al. | |
| 2007/0100618 A1 | 5/2007 | Lee et al. | |
| 2007/0168448 A1 | 7/2007 | Garbow et al. | |
| 2008/0091435 A1 | 4/2008 | Strope et al. | |
| 2008/0168070 A1 | 7/2008 | Naphade et al. | |
| 2011/0082825 A1 | 4/2011 | Sathish et al. | |
| 2011/0286596 A1 * | 11/2011 | Gressel | H04L 9/0637 380/268 |
| 2011/0314012 A1 | 12/2011 | Kenthapadi et al. | |
| 2012/0005515 A1 | 1/2012 | Reddi et al. | |
| 2012/0053945 A1 | 3/2012 | Gupta et al. | |
| 2013/0166485 A1 | 6/2013 | Hoffmann et al. | |
| 2013/0317808 A1 | 11/2013 | Kruel et al. | |
| 2014/0075004 A1 | 3/2014 | Van Dusen et al. | |
| 2014/0282138 A1 | 9/2014 | Hopton et al. | |
| 2014/0297281 A1 | 10/2014 | Togawa et al. | |
| 2014/0317030 A1 | 10/2014 | Shen et al. | |
| 2014/0330818 A1 | 11/2014 | Raina et al. | |
| 2015/0006143 A1 | 1/2015 | Skiba et al. | |
| 2015/0032724 A1 | 1/2015 | Thirugnanasundaram et al. | |
| 2015/0052002 A1 | 2/2015 | Welch et al. | |
| 2015/0142704 A1 | 5/2015 | London | |
| 2015/0215624 A1 | 7/2015 | Wei | |
| 2015/0228275 A1 | 8/2015 | Watanabe et al. | |
| 2015/0310377 A1 | 10/2015 | Duval et al. | |
| 2015/0363393 A1 | 12/2015 | Williams et al. | |
| 2015/0365387 A1 | 12/2015 | Good | |
| 2016/0092688 A1 | 3/2016 | Wolrich et al. | |
| 2016/0163311 A1 | 6/2016 | Crook et al. | |
| 2016/0163314 A1 | 6/2016 | Fujii et al. | |
| 2016/0180151 A1 | 6/2016 | Philbin et al. | |
| 2016/0182672 A1 | 6/2016 | Kuperman et al. | |
| 2016/0247068 A1 | 8/2016 | Lin | |
| 2016/0364522 A1 | 12/2016 | Frey et al. | |
| 2017/0011279 A1 | 1/2017 | Soldevila et al. | |
| 2018/0012231 A1 | 1/2018 | Sapoznik et al. | |
| 2018/0012232 A1 | 1/2018 | Sehrawat et al. | |
| 2018/0013699 A1 | 1/2018 | Sapoznik et al. | |

OTHER PUBLICATIONS

Al-Rfou, et al., "Conversational Contextual Cues: The Case of Personalization and History for Response Ranking", CoRR abs/1606.00372, http://arxiv.org/abs/1606.00372, 2016, 10 pages.

Bahdanau, et al., "Neural Machine Translation by Jointly Learning to Align and Translate", CoRR abs/1409.0473, http://arxiv.org/abs/1409.0473, 2014, 15 pages.

Bengio, et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Brown, et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Carrier, et al., "LSTM Networks for Sentiment Analysis", http://deeplearning.net/tutorial/lstm.html, accessed on Sep. 20, 2016, 5 pages.

Chen, et al., "An empirical investigation of sparse log-linear models for improved dialogue act classification", 2013 IEEE International Conference on Acoustics. Speech and Signal Processing. IEEE., 2013, 6 pages.

Chen, "An empirical investigation of sparse log-linear models for improved dialogue act classification.", 2013 IEEE International Conference on Acoustics, Speech and Signal Processing. IEEE, 2013, pp. 1-6.

Courbariaux, et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

Gong, et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.

Hochreitner, et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.

Ji, et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.

Karpathy, "The Unreasonable Effectiveness of Recurrent Neural Networks", http://karpathy.github.io/2015/05/21/rnn-effectiveness/, (accessed on Sep. 20, 2016), May 21, 2015, 42 pages.

Kim, et al., "Character-Aware Neural Language Models", CoRR abs/1508.06615, http://arxiv.org/abs/1508.06615, 2015, 9 pages.

Kim, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.

Lai, et al., "Recurrent Convolutional Neural Networks for Text Classification", AAAI'15 Proceedings of the Twenty-Ninth AAAI Conference on Artificial Intelligence, 2015, pp. 2267-2273.

Lai, et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPR_paper.pdf, 2015 (accessed Jan. 3, 2017), pp. 3270-3278.

Larochelle, et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.

Lee, et al., "Robust Dialog Management with N-best Hypotheses Using Dialog Examples and Agenda", Proceedings of ACL-08: HLT, Columbus, Ohio, Jun. 2008, pp. 630-637.

(56) References Cited

OTHER PUBLICATIONS

Levy, et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.

Li, et al., "A Hierarchical Neural Autoencoder for Paragraphs and Documents", Proceedings of the 53rd Annual Meeting of the Association for Computational Linguistics and the 7th International Joint Conference on Natural Language Processing,Beijing, China, http://web.stanford.edu/~jurafsky/pubs/P15-1107.pdf, Jul. 26-31, 2015 (accessed on Jan. 3, 2017), pp. 1106-1115.

Miao, et al., "Neural Variational Inference for Text Processing", CoRR abs/1511.06038, http://arxiv.org/abs/1511.06038, 2015, 15 pages.

Mikolov, et al., "Distributed Representations of Words and Phrases and their Compositionality", CoRR abs/1310.4546, http://arxiv.org/abs/1310.4546, 2013, 9 pages.

Mikolov, et al., "Distributed Representations ofWords and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

Mikolov, et al., "Recurrent neural network based language model", Interspeech 2010, Sep. 26-30, 2010, Makuhari, Chiba, Japan, 2010, pp. 1045-1048.

Mikolov, et al., "Recurrent neural network based language model", Interspeech 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan. 3, 2017), pp. 1045-1048.

PCT/US2016/049896, "Application Serial No. PCT/US2016/049896, International Search Report and the Written Opinion dated May 19, 2017", 14 pages.

Rush, et al., "Optimal Beam Search for Machine Translation", Proceedings of EMNLP 2013, Oct. 18-21, 2013, Seattle, Washington, USA, 2013, 12 pages.

Shi, et al., "Contextual spoken language understanding using recurrent neural networks.", 2015 IEEE International conference on Acoustics, Speech and Signal Processing (ICASSP). IEEE, 2015, pp. 5271-5275.

Sutskever, et al., "Sequence to Sequence Learning with Neural Networks", CoRR abs/1409.3215, http://arxiv.org/abs/1409.3215, 2014, 9 pages.

Tai, et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.

Vinyals, et al., "A Neural Conversational Model", CoRR abs/1506.05869, http://arxiv.org/abs/1506.05869, 2015, 8 pages.

Zhang, et al., "Character-level Convolutional Networks for Text Classification", CoRR abs/1509.01626, http://arxiv.org/abs/1509.01626, 2015, 9 pages.

U.S. Appl. No. 15/254,008, filed Sep. 1, 2016, Pending.
U.S. Appl. No. 15/254,041, filed Sep. 1, 2016, Pending.
U.S. Appl. No. 15/254,061, filed Sep. 1, 2016, Pending.
U.S. Appl. No. 15/254,086, filed Sep. 1, 2016, Pending.
U.S. Appl. No. 15/254,101, filed Sep. 1, 2016, Pending.
PCT/US2016/049896, filed Sep. 1, 2016, Pending.
U.S. Appl. No. 15/383,603, filed Dec. 19, 2016, Pending.
PCT/US2017/040205, "Application Serial No. PCT/US2017/040205, International Search Report and the Written Opinion dated Sep. 15, 2017", 11 pages.

\* cited by examiner

WORD HASH LANGUAGE MODEL

FIELD OF THE INVENTION

The present invention relates to selecting words using a language model.

BACKGROUND

Statistical language models are used in a variety of natural language processing applications such as speech recognition, machine translation, sentence completion, part-of-speech tagging, parsing, handwriting recognition, and information retrieval. A language model may provide a probability or likelihood of a sequence of words occurring. In some applications, a sequence of words is provided, and it is desired to determine one or more words that are most likely to follow the sequence of words. Existing language models may require large models (e.g., a large number of parameters in a neural network language model) or may require significant computations, which may place a burden on an automated system. Therefore, techniques for improving the computational efficiency of statistical language models are needed.

BRIEF DESCRIPTION OF THE FIGURES

The invention and the following detailed description of certain embodiments thereof may be understood by reference to the following figures.

DETAILED DESCRIPTION

Described herein are techniques for implementing statistical language models that may provide improved performance over existing language models. Language models compute probabilities or likelihoods for sequences of words or may select a word to follow a sequence of words. Existing language models may compute a probability for each word in a vocabulary of words, and for large vocabularies, this may be computationally intensive and/or require a large number of parameters to be stored. In some implementations, the language models described herein may instead output a vector that describes words that are likely to follow an input sequence of words, and this output vector may be used to select one or more words that may follow the input sequence of words. For example, the output vector may be a word embedding or a word hash vector.

Language models are used in a wide variety of speech processing applications, such as speech recognition, machine translation, sentence completion, part-of-speech tagging, parsing, handwriting recognition, and information retrieval. By reducing the amount of computations performed by a language model and/or reducing the size of the language model, speech processing applications may be performed more quickly and/or require fewer computational resources. For example, smaller language models may be used on smaller devices, such as mobile phones or smart phones.

Figure 1:
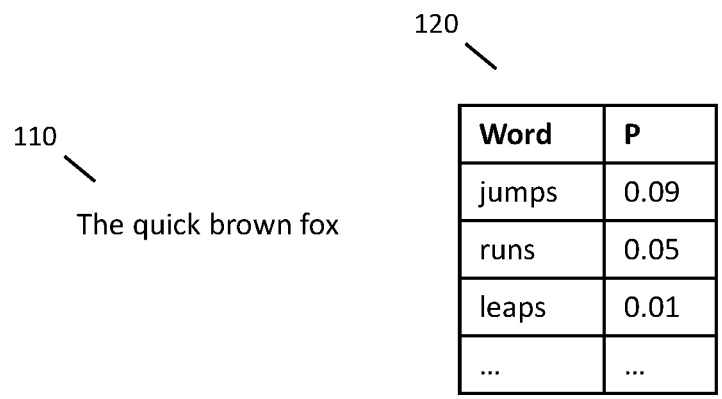
FIG. 1 illustrates an input sequence of words and probabilities generated by a language model for possible subsequent words.

FIG. 1 illustrates a sequence of words 110 and probabilities 120 of words that may follow the sequence of words. The sequence of words 110 is "The quick brown fox." The probabilities 120 include probabilities of individual words that may follow the sequence of words 110. For example, the most probable subsequent word may be "jumps" with a probability of 0.09, the second most probable word may be "runs" with a probability of 0.05, and so forth. Because the number of words that may follow the sequence of words 110 may be large (e.g., 50,000 or more), the probabilities of even the most probable words may be small (the sum of all the probabilities must be less than 1). Conventional language models may include n-gram language models and continuous space language models, such as neural network language models and log-bilinear language models.

Figure 2A:
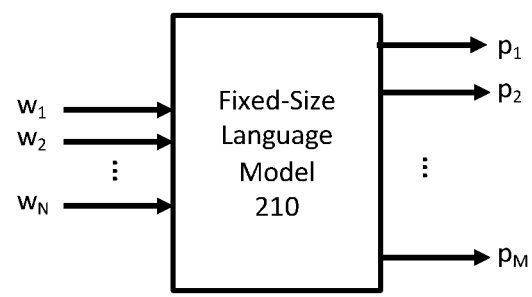
FIGS. 2A and 2B are example systems for language models.
Figure 2B:
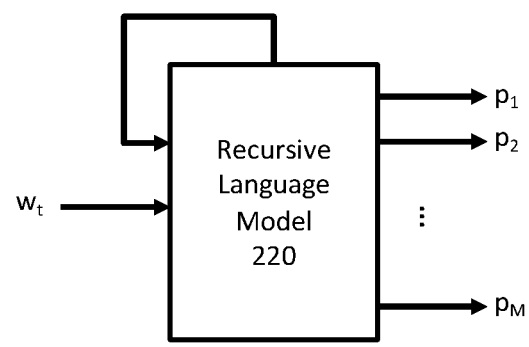

FIGS. 2A and 2B illustrate two variations of language model implementations. In FIG. 2A, fixed-size language model 210 receives a sequence of N words, denoted as $w_1$ to $w_N$. N may be referred to as the size of the language model. For example, where N is 4, the 4 words may be "The quick brown fox." Fixed-size language model 210 receives the N words and outputs probabilities for words that may follow the input words. The probabilities are denoted as $p_1$ to $p_M$, where M may represent the number of words in the vocabulary. One or more words having the highest probabilities may then be used for subsequent processing, such as speech recognition or machine translation. In some implementations, fixed size language model 210 may output a probability or likelihood for each word of a vocabulary of words (e.g., 50,000 or more words), and in some implementations, fixed-size language model 210 may output probabilities for a smaller number of words.

At a first iteration of using fixed-size language model 210 with a size of 4, the input may be "The quick brown fox" and the word "jumps" may be selected as the most likely next word. In a subsequent iteration, the input words may be "quick brown fox jumps" and fixed-size language model 210 may output probabilities for possible subsequent words.

In FIG. 2B, recursive language model 220 sequentially processes words and outputs probabilities after each iteration. For a first iteration, recursive language model 220 may process "The" and output probabilities for possible subsequent words. As above, language model 220 may output a probability or likelihood for each word of a vocabulary of words (e.g., 50,000 or more words). For a second iteration, recursive language model 220 may process "quick" and output probabilities for possible subsequent words, and so forth. Recursive language model 220 may include a feedback loop so that information about previous iterations may be used in later iterations.

Figure 3A:
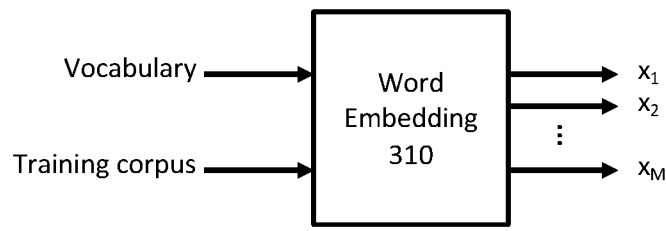
FIGS. 3A, 3B, and 3C are example systems for language models that process word embeddings.
Figure 3B:
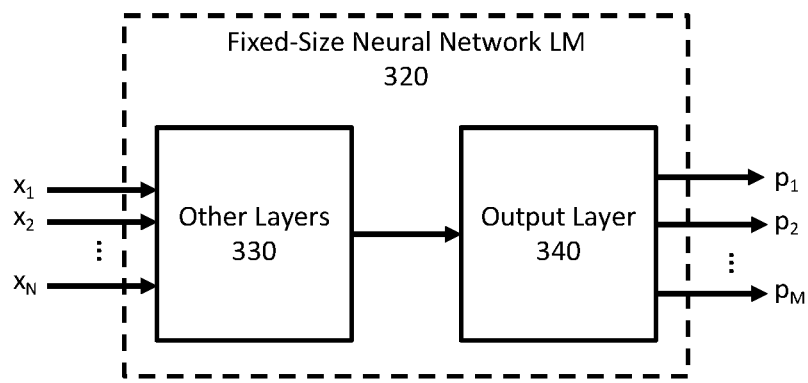
Figure 3C:
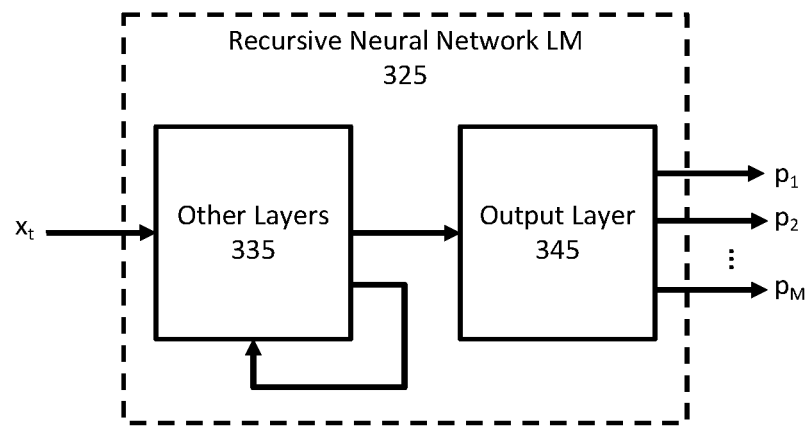

FIGS. 3A, 3B, and 3C illustrate implementations of statistical language models using neural networks. FIG. 3A computes word embeddings for words in the vocabulary, FIG. 3B is an example of a fixed-size neural network language model, and FIG. 3C is an example of a recursive neural network language model.

In FIG. 3A, word embeddings are computed for each word of a vocabulary of words. A word embedding is fixed-length vector that represents the words of the vocabulary in a vector space. In some implementations, words with similar meanings may have word embeddings that are close to each other in the vector space. Word embeddings may be determined by processing a training corpus of text for a specified vocabulary of words. In FIG. 3A, word embedding component 310 receives the training corpus of text and the vocabulary of words for which it is desired to create word embeddings (the training corpus may contain additional words for which word embeddings are not desired). Word embedding component 310 processes the training corpus and determines a word embedding for each word in the vocabulary. The embeddings are denoted as $x_1 \ldots x_M$. Any appropriate techniques may be used to generate the word embeddings. For example, word embedding component 310 may include any unsupervised embedding method (e.g., Word2Vec, GLoVe, SPPMI-SVD), Hellinger principal components analysis, autoencoders, or spectral embeddings.

FIG. 3B illustrates a fixed-size neural network language model (LM) 320. A neural network may include multiple layers of processing, and in FIG. 3B the layers of fixed-size neural network LM 320 are indicated as an output layer 340 and other layers 330, where other layers 330 may represent all layers other than the output layer 340. In some implementations, fixed-size neural network LM 320 may have only a single layer and thus other layers 330 may not be present and the inputs may connect directly to output layer 340.

Fixed-size neural network LM 320 receives a number of word embeddings corresponding to the size of the language model, denoted as N. The word embeddings may be processed by other layers 330, the output of other layers 330 may be processed by output layer 340, output layer may generate a probability for each word in the vocabulary, and the probabilities are denoted as $p_1$ to $p_M$. Fixed-size neural network LM 320 may include any fixed-size neural network language model known to one of skill in the art.

In some implementations, fixed-size neural network LM 320 may be implemented with a single layer as follows:

$$p_i = softmax\left(W\begin{bmatrix} x_1 \\ \vdots \\ x_N \end{bmatrix} + b\right)_i$$

$$softmax(y)_i = \frac{e^{y_i}}{\sum_j e^{y_j}}$$

where W is a matrix of parameters and b is a vector of parameters. Where the vocabulary has size M, the neural network has size N, and the word embeddings have length P, then W will be a M by NP matrix and b will be a vector of length M. In this example implementation, other layers 335 is not present and output layer 340 receives the word embeddings, performs the softmax operation, and outputs the probabilities.

FIG. 3C illustrates a recursive neural network language model 325. A recursive neural network may also include multiple layers of processing, and in FIG. 3C the layers of recursive neural network LM 325 indicated as an output layer 345 and other layers 335, where other layers 335 may represent all layers other than the output layer 345. Other layers 335 may be recursive in that an output at one iteration may be used in a subsequent iteration. In some implementations, output layer 345 may perform the same processing as output layer 340.

Recursive neural network LM 325 may iteratively process a sequence of word embeddings. For example, a first iteration may process word embedding $x_1$, a second iteration may process word embedding $x_2$, and so forth. The output of other layers 335 may be processed by output layer 345, output layer may generate a probability for each word in the vocabulary, and the probabilities are denoted as $p_1$ to $p_M$. Recursive neural network LM 325 may include any recursive neural network language model known to one of skill in the art.

In some implementations, recursive neural network LM 325 may be implemented using a recurrent neural network as follows:

$$p_i = softmax(Wh_t + b)_i$$

$$h_t = \tanh(Ux_t + Vh_{t-1})$$

$$\tanh(y)_i = \frac{e^{y_i} - e^{-y_i}}{e^{y_i} + e^{-y_i}}$$

where W, U, and V are matrices of parameters, b is a vector of parameters, and $h_t$ is a hidden state of the neural network that is computed at iteration t. Where the vocabulary has size M, the hidden size of the neural network is Q and the word embeddings have length P, then W is a M by Q matrix, U is a Q by P matrix, V is a Q by Q matrix, and b is a vector of length M. The hidden state $h_0$ may be initialized to a 0 vector.

In this example implementation, other layers 335 receives the word embedding $x_t$ at each iteration and outputs a hidden vector $h_t$. Output layer 345 receives the hidden vector $h_t$, performs the softmax operation, and outputs the probabilities.

In some implementations, recursive neural network LM 325 may be implemented using a recurrent neural network with long short-term memory units as follows:

$$p_i = softmax(Wh_t + b)_i$$

$$h_t = o_t \odot \tanh(c_t)$$

$$c_t = i_t \odot \tilde{h}_t + f_t \odot c_{t-1}$$

$$i_t = \sigma(U_i x_t + V_i h_{t-1})$$

$$o_t = \sigma(U_o x_t + V_o h_{t-1})$$

$$f_t = \sigma(U_f x_t + V_f h_{t-1})$$

$$\tilde{h}_t = \tanh(U_h x_t + V_h h_{t-1})$$

$$\sigma(y)_i = \frac{1}{1 + e^{-y_i}}$$

where W is a M by Q matrix of parameters, b is a vector of parameters of length M, the $U_i$, $U_o$, $U_f$, $U_h$ are Q by P matrices of parameters; the $V_i$, $V_o$, $V_f$, $V_h$ are Q by Q matrices of parameters; $\odot$ is the element-wise multiplication operator, $h_0$ is initialized as a zero vector; and $c_0$ is initialized as a zero vector.

In this example implementation, other layers 335 receives the word embedding $x_t$ at each iteration and outputs a hidden vector $h_t$ using the operations described above. Output layer 345 receives the hidden vector $h_t$, performs the softmax operation, and outputs the probabilities.

The implementations of neural networks described above may be computationally intensive in that they output a probability for each word in the vocabulary. In some implementations, the size of the vocabulary may be large, such as more than 50,000 words. Implementations described above include the matrix-vector multiplication $Wh_t$, where the number of rows in W is the size of the vocabulary, and for large vocabularies, the amount of required computations may be high.

To reduce the computations of a neural network language model, the neural network language model may be modified to output a word embedding that describes a likely next word instead of outputting a probability for each word in the vocabulary. For example, in some implementations, the size of the vocabulary may be around 50,000 words, but the length of the word embeddings may be around 500. Outputting a word embedding vector of length 500 may be less computationally expensive than outputting a vector of probabilities of length 50,000. The computed word embedding output by a neural network language model may be referred to as an output word embedding.

The output word embedding may be used to determine likely next words. Word embeddings may be computed for each word in the vocabulary, such as by computing word embeddings with word embedding component 310. To find likely next words, words may be selected whose word embeddings are close to the output word embedding. For example, a distance may be computed between the output word embedding and the word embedding for each word in the vocabulary. The distances may be sorted, and one or more words may be selected whose word embeddings are closest to the output word embedding.

However, selecting one or words based on the distance of their embeddings to the output word embedding may also be computationally intensive. For example, for a vocabulary of 50,000 words, 50,000 distance computations may need to be performed.

To further improve performance, hash vectors may be used instead of word embeddings. A word embedding may have real numbers, where a hash vector may have only boolean values. Performing computations with boolean values may be more efficient as explained in greater detail below. A hash vector, as used herein, is not limited to storing values in a vector form, and a hash vector may include storing values as a matrix or tensor as the techniques described herein are not limited to any precise arrangement of hash values.

Figure 4A:
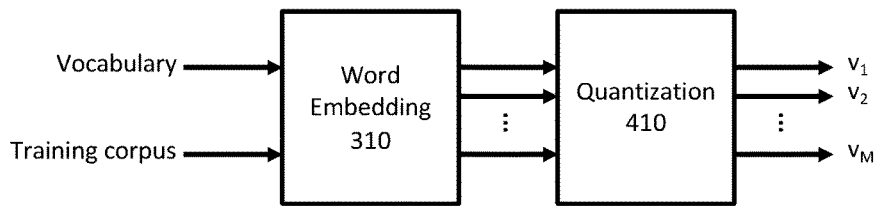
FIGS. 4A, 4B, and 4C are example systems for language models that process hash vectors.
Figure 4B:
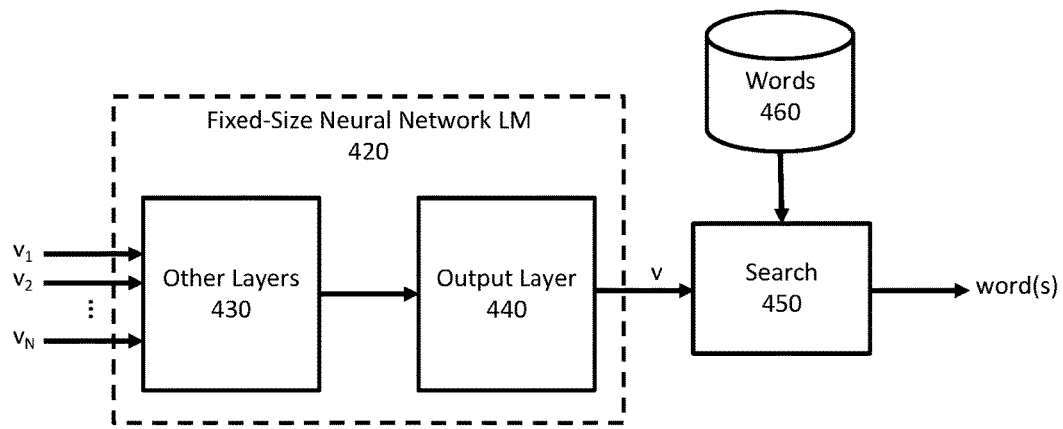
Figure 4C:
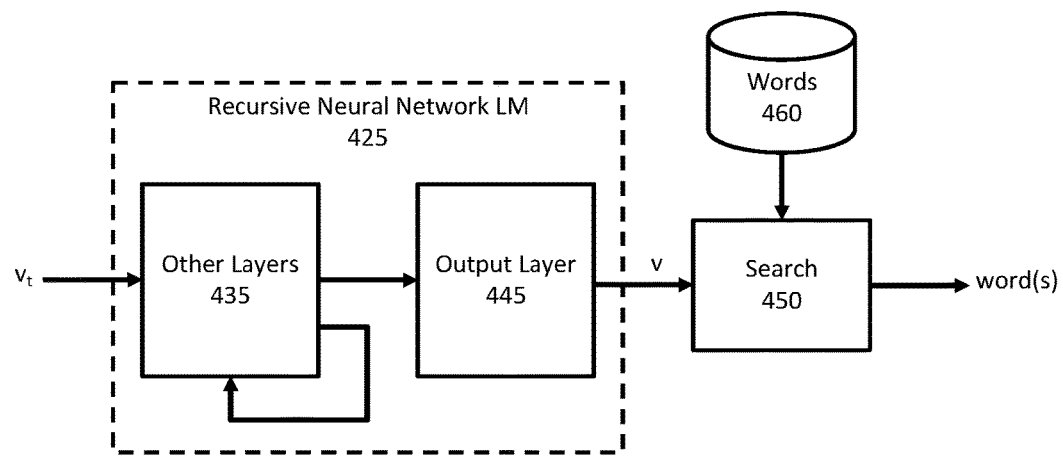

FIGS. 4A, 4B, and 4C illustrate implementations of statistical language models using hash vectors. FIG. 4A computes hash vectors for words in the vocabulary, FIG. 4B is an example of a fixed-size neural network language model that processes hash vectors, and FIG. 4C is an example of a recursive neural network language model that processes hash vectors.

In FIG. 4A, hash vectors are computed for each word of a vocabulary of words. In the example of FIG. 4A, hash vectors are computed from the word embeddings of FIG. 3A, but in other implementations, hash vectors may be computed directly from the training corpus and word embeddings need not be computed. The length of the hash vector may be denoted as P, which may be the same as the length of the word embeddings when the hash vectors are computed from word embeddings.

In the example of FIG. 4A, quantization component 410 receives word embeddings for all the words in the vocabulary from word embedding component 310. In some implementations, quantization component 410 may be implemented as follows. A matrix E may be created where each row of the matrix E is a word embedding of a word from the vocabulary. This matrix E may then be average-centered. An average row vector may be computed as $\mu = 1/M \Sigma_{i=1}^{M} E_1$, where M is the number of rows and $E_i$ is the $i^{th}$ row of E. The matrix E may then be modified by subtracting the average row vector from each row of the matrix E.

The average-centered matrix E may then be used train a rotation matrix R for generating hash vectors. The rotation matrix may be initialized, such as by initializing it to a random rotation. The rotation matrix may then be trained by sequentially performing the following updates:

$$B = \text{sign}(ER)$$

$$U, S, V = SVD(B^T E)$$

$$R = VU^T$$

where signs ( ) returns matrix of 1's and −1's according to the sign of corresponding elements of the input and SVD( ) performs a singular value decomposition of the input. This sequence of operations may be performed until a convergence criterion has been met. Each row of the final matrix B contains a hash vector for a corresponding word embedding and the final matrix B may have values of only 1 and −1. In some implementations, the matrix B may be converted to a matrix of 1s and 0s by converting all the −1s to 0s or performing some other similar operation.

In some implementations, hash vectors may be computed directly from the training corpus without computing word embeddings. For example, Brown clustering may be used to create a binary tree where each word of the vocabulary is associated with a leaf of the binary tree. To create a hash vector for a word, the binary tree may be traversed from the root node to the leaf node and building the hash by including a 0 for traversing to a left child and a 1 for traversing to a right child (or vice versa). Where not all paths are the same length, hashes may be padded (e.g., with 0's or 1's) to obtain hashes of a constant length.

The hash vectors generated in FIG. 4A may be used in place of word embeddings. In FIG. 4B, fixed-size neural network LM 420 receives N hash vectors as input, denoted as $v_1$ to $v_N$, and outputs an output hash vector v. For example, where the neural network has size 4, $v_1$ may be the hash vector for "The", $v_2$ may be the hash vector for "quick", $v_3$ may be the hash vector for "brown", and $v_4$ may be the hash vector for "dog". The output hash vector may be equal or close to the hash vector for "jumps".

In FIG. 4B, other layers 430 may provide any of the functionality described above for other layers 330 or other layers 335. For example, other layers 430 may output a hidden state vector of the neural network or other layers 430 may not be present and output layer 440 may directly receive hash vectors as input.

In FIG. 4B, output layer 440 may receive the hidden state vector of the neural network (or the word hashes where other layers 430 is not present) and compute an output word hash. Any appropriate techniques may be used by output layer 440 to compute the output word hash.

In some implementations, output layer 440 may use multi-class logistic regression to compute an output hash vector. Where output layer 440 receives a hidden neural network state as input, output layer 440 may compute $$v = \tau(\sigma(Wh+b))$$

$$\tau(s) = \begin{cases} 0, & s < 0.5 \\ 1, & s \geq 0.5 \end{cases}$$

where W is a P by Q matrix of parameters, b is a vector of parameters of length P, h is a hidden vector of length Q, v is the output hash vector of length P, and σ is defined above.

Where output layer 440 receives word hash vectors as input, output layer 440 may compute $$v = \tau\left(\sigma\left(W\begin{bmatrix} v_1 \\ \vdots \\ v_N \end{bmatrix} + b\right)\right)$$

where W is a P by NP matrix of parameters and τ and b are as defined above.

The parameters of the multi-class logistic regression classifier may be trained using any appropriate techniques. In some implementations, the multi-class logistic regression classifier may be trained by optimizing a loss function using stochastic gradient descent on the entire neural network. One example of a loss function is:

$$L = \frac{1}{P}(v_{N+1}^T \log(\sigma(Wh+b)) + (1-v_{N+1})^T \log(1-\sigma(Wh+b)))$$

where $v_{N+1}$ is the hash vector for the word that follows the N words input into fixed-size neural network LM 420 in the training data, superscript T is the transpose operator, and 1 is a vector of ones of length P.

In some implementations, output layer 440 may use a linear kernel support vector machine to compute an output hash vector. Where output layer 440 receives a hidden neural network state as input, output layer 440 may compute $$v = \frac{\text{sign}(Wh) + 1}{2}$$

where sign is defined above and W is a P by Q matrix of parameters. Where output layer 440 receives word hash vectors as input, output layer 440 may compute $$v = \frac{\text{sign}\left(W\begin{bmatrix} v_1 \\ \vdots \\ v_N \end{bmatrix}\right) + 1}{2}$$

The parameters of the linear kernel support vector machine may be trained using any appropriate techniques. In some implementations, the linear kernel support vector machine may be trained by optimizing a loss function using stochastic gradient descent on the entire neural network. One example of a loss function is:

$$L = 1/2 \|Wh\|_2^2 + \alpha \Sigma_{i=1}^P y_i$$

$$y = \max(0, 1 - Wh \odot v_{N+1})^2$$

where $v_{N+1}$ is defined above, alpha is a fixed hyperparameter, max is an element-wise maximum operator, 0 is a vector of zeros, and 1 is a vector of ones.

Fixed-size neural network LM 420 outputs a hash vector v that describes words likely to follow the N words input into the language model. The output hash vector may then be used to select words that may follow the N input words.

Search component 450 may receive the output hash vector and select one or more words whose hash vectors are equal to or close to the output hash vector. In some implementations, search component 450 may use words data store 460 where words data store 460 stores information about words in the vocabulary along with a hash vector computed for words in the vocabulary. Search component 450 may obtain words by comparing the output hash vector to hash vectors stored in words data store 460.

In some implementations, search component 450 may retrieve all words from words data store 460 where the hash vector of the word is close to or equal to the output hash vector by performing a query using the output hash vector.

In some implementations, search component 450 may retrieve all words where the hash vector of the word is within a Hamming radius or distance of the output hash vector. A Hamming radius of a hash vector may comprise all other vectors where the number of different elements is less than or equal to a specified value. A Hamming radius of 1 for an output hash vector would include a word hash vector that is identical to the output hash vector and all word hash vectors whose elements are the same as the output hash vector for all but one element. For example, for an output hash vector of [1, 0, 1, 0], word hash vectors within a Hamming distance of 1 would include [1, 0, 1, 0]; [0, 0, 1, 0]; [1, 1, 1, 0]; [1, 0, 0, 0]; and [1, 0, 1, 1]. Search component 450 may determine all word hash vectors within a Hamming radius of the output hash vector and retrieve corresponding words from words data store 450.

In some implementations, search component 450 may implement an inverted index to speed up retrieval of words using the output hash vector. An inverted index may include a list of words corresponding to each possible hash vector, and allow for fast retrieval of words from words data store 450.

In FIG. 4C, recursive neural network LM 425 receives a sequence of hash vectors as input, where a hash vector is processed at each iteration of processing, and outputs a hash vector at each iteration of processing. For example, for a first iteration, recursive neural network LM 425 may process $v_1$ corresponding to the hash vector for "The" and output a hash vector. For a second iteration, recursive neural network LM 425 may process $v_2$ corresponding to the hash vector for "quick" and output a hash vector. Subsequent iterations may process hash vectors for subsequent words.

In FIG. 4C, other layers 435 may provide any of the functionality described above for other layers 330 or other layers 335. For example, other layers 435 may output a hidden state vector of the neural network or other layers 435 may not be present and output layer 445 may directly receive hash vectors as input.

In FIG. 4C, output layer 445 may receive the hidden state vector of the neural network (or the word hashes where other layers 435 is not present) and compute an output word hash. Any appropriate techniques may be used by output layer 445 to compute the output word hash, including any of the techniques described above for output layer 440.

In FIG. 4C, search component 450 and words data store 460 may have the same functionality as the corresponding components of FIG. 4B.

The one or more words selected by the language models of FIG. 4B or 4C may then be used for any application of natural language processing, such as speech recognition, machine translation, sentence completion, part-of-speech tagging, parsing, handwriting recognition, and information retrieval.

Language models that process hash vectors may perform better than other language models. Performing computations on hash vectors may be faster and/or consume less memory than performing computations on vectors of real numbers. For example, a matrix-vector multiplication may be faster and/or consume less memory when the vector is a hash vector since multiplications with 1's and 0's may be faster than multiplications with real numbers. Further, selecting words using hash vectors may be faster than selecting words associated with vectors of real numbers, such as word embeddings. Computing a Hamming distance between hash vectors may be a faster operation than computing a distance function between two vectors of real numbers.

In some applications of statistical language models, words may be used in an iterative processing task, and a beam search or graph (or hypergraph) search algorithm may be used to provide better results for the overall result. An example of a graph search for performing sentence completion is now described.

Figure 5:
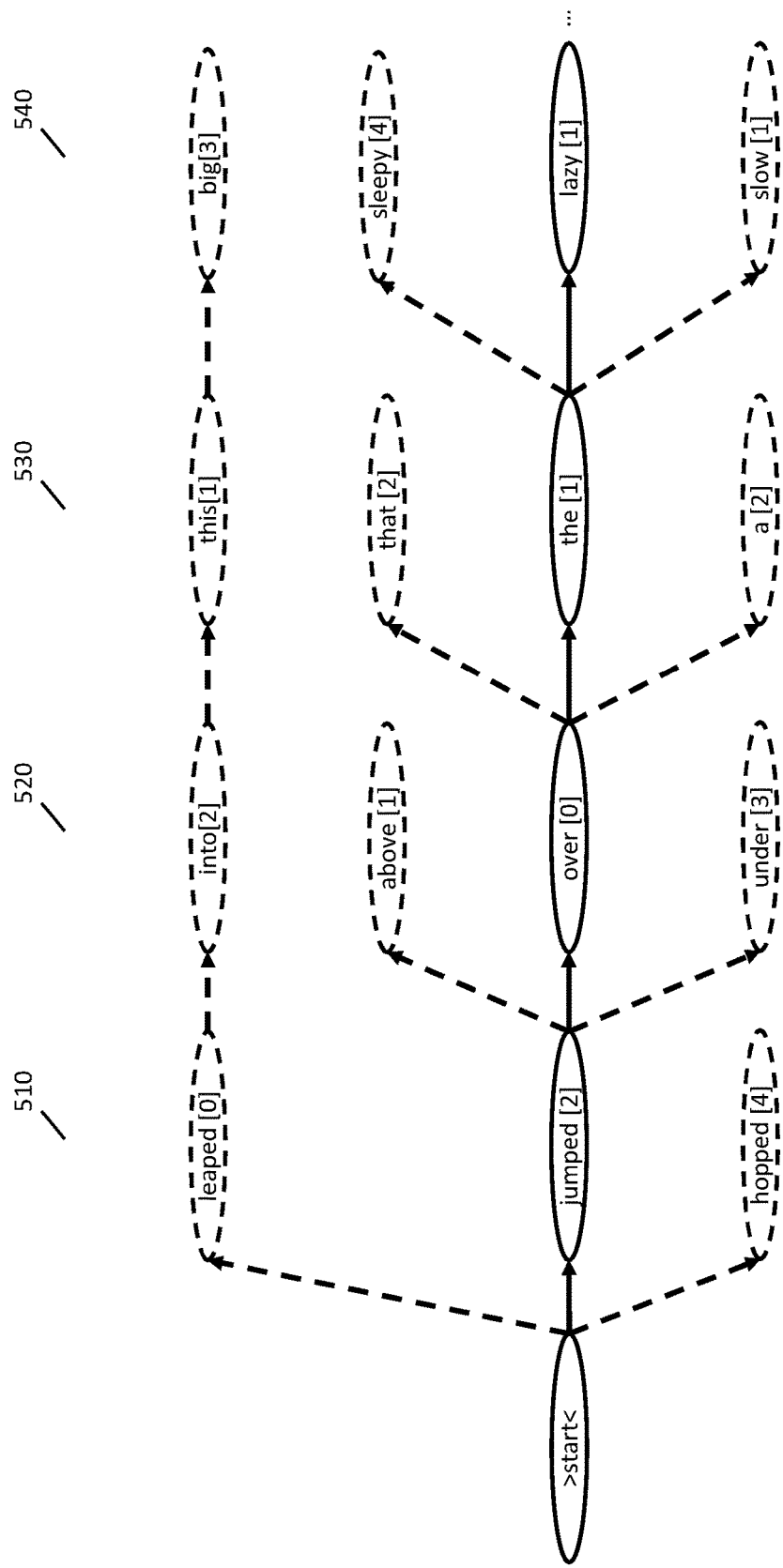
FIG. 5 is an example search graph.

FIG. 5 illustrates an example search graph that may be created when performing a sentence completion task. For the example of FIG. 5, the provided words may be "The quick brown fox," and it is desired to construct a completion to the provided words by finding likely subsequent words. A search graph may be initialized with a root node, such as the ">start<" node of FIG. 5. The words "The quick brown fox" may be input to a language model, such as the language models described above, to find likely words that could follow "The quick brown fox."

In some implementations, nodes may be added to the search graph using Hamming distances. For example, a language model may output a hash vector, and all words may be selected where the hash vector for the word is within the specified Hamming distance of the output hash vector. For the example of FIG. 5, the specified Hamming distance is 4 so words with a Hamming distance of less than or equal to 4 are added to the search graph. For example, for a first stage of processing 510, the words "leaped" with a Hamming distance of 0, "jumped" with a Hamming distance of 2, and "hopped" with a Hamming distance of 4 are added to the search graph. The words and Hamming distances are indicated in the nodes of the search graph in FIG. 5.

For each node added to the search graph, this process may be repeated. For example, a language model may process "The quick brown fox leaped" and output a hash vector that may be used to determine possible subsequent words. This process may also be repeated for "The quick brown fox jumped" and the "The quick brown fox hopped." FIG. 5 illustrates some example nodes that may be added at this second stage of processing 520 with the words and Hamming distances indicated in the search graph.

FIG. 5 also illustrates a third stage of processing 530 and a fourth stage of processing 540 with additional nodes being added to the search graph at each stage. For clarity of presentation, a small number of nodes are presented, but in some implementations, there may be a larger number of words within the specified Hamming distance or a larger Hamming distance may be used to select a larger number of words for consideration in the graph search.

A path may be selected from the search graph as a proposed completion to "The quick brown fox." To select a path from the search graph, a score may be computed for each path in the search graph, and the path with the best score (e.g., highest or lowest) may be selected. In some implementations, the path score may be determined by summing the Hamming distances of the nodes in the path. For the example of FIG. 5, the best scoring path is "jumped over the lazy" with a score of 4, and is indicated with solid lines. Other paths in the example search graph have higher scores. For example, "leaped into this big" has a score of 6.

A search graph may become large in size. For example, if each iteration adds 10 nodes to a previous node, then a first iteration will have 10 nodes, a second iteration will have 100 nodes, a third iteration will have 1000 nodes and so forth. To reduce the size of the search graph, pruning techniques may be used. For example, only a specified number of top scoring paths may be retained or only paths with a score exceeding a specified threshold may be retained. Any pruning techniques known to one of skill in the art may be used, Graph searches may similarly be used for other applications of language models, such as speech recognition, machine translation, sentence completion, part-of-speech tagging, parsing, handwriting recognition, and information retrieval. The construction of the search graph and the techniques for determining the best scoring paths through the graph may be adapted to the particular application. For example, where the language models are being used for speech recognition, the scores for the paths may be determined using an acoustic model score.

Figure 6:
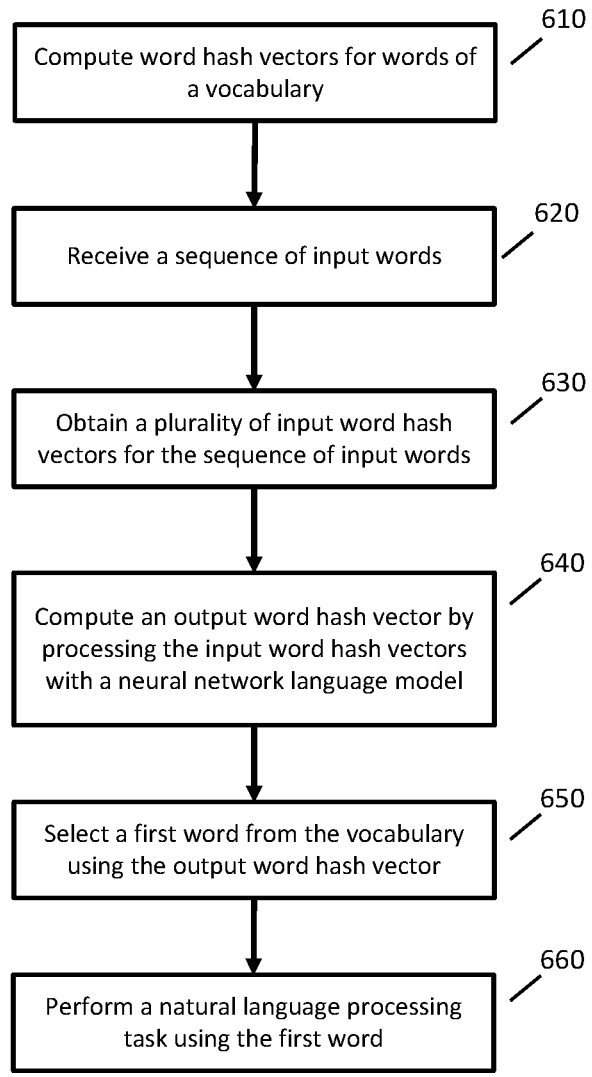
FIG. 6 is a flowchart for an example implementation of selecting a word to follow a sequence of words using hash vectors.

FIG. 6 is a flowchart of an example implementation of selecting a word using a language model. In FIG. 6, the ordering of the steps is exemplary and other orders are possible, not all steps are required and, in some implementations, some steps may be omitted or other steps may be added. The process of the flowcharts may be implemented, for example, by any of the computers or systems described herein.

At step 610, a word hash vector is computed for words of a vocabulary. The vocabulary may be any set of words used for a speech processing task. For example, the vocabulary may include 50,000 commonly used English words. The word hash vectors may be computed using any appropriate techniques, such as any of the techniques described herein. In some implementations, the word hash vectors may be computed by using Brown clustering or by first computing word embeddings for words of the vocabulary and then computing the word hash vectors from the word embeddings.

At step 620, a sequence of words is received. The sequence of words may be any sequence of words used in a natural language processing task. For example, for a sentence completion task, the sequence of words may have been input by a user. For a speech recognition task, the sequence of words may have been obtained by performing speech recognition on an audio signal received from a user.

At step 630, a plurality of input word hash vectors is obtained for the sequence of words. For example, a word hash vector may be retrieved from a data store for each word of the sequence of words.

At step 640, an output word hash vector is computed by processing the input word hash vectors with a neural network language model. The neural network language model may be any language model that processes hash vectors, such as a fixed-size language model, a recursive language model, a language model that uses multi-class logistic regression in the output layer, or a language model that uses a linear kernel support vector machine in the output layer.

Any of the techniques described herein may be used to compute the output word hash vector.

At step 650, a first word is selected from the vocabulary of words using the output word hash vector. Any of the techniques described herein may be used to select the first word using the output word hash vector. For example, the first word may have a hash vector that is close to or equal to the output hash vector. An inverted index may be used to select the first word.

At step 660, a natural language processing task is performed using the first word. For example, any of speech recognition, machine translation, sentence completion, part-of-speech tagging, parsing, handwriting recognition, and information retrieval may be performed using the first word.

Figure 7:
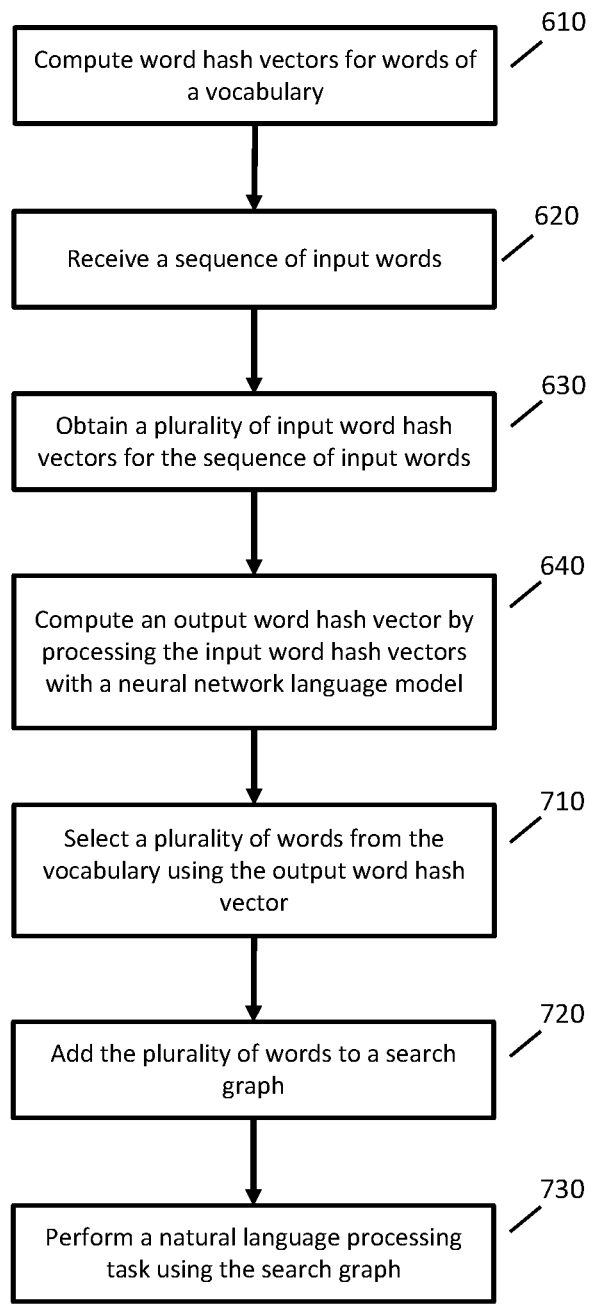
FIG. 7 is a flowchart for an example implementation of adding a plurality of words to a search graph using hash vectors.

FIG. 7 is a flowchart of an example implementation of performing a natural language processing task using a search graph. In FIG. 7, the ordering of the steps is exemplary and other orders are possible, not all steps are required and, in some implementations, some steps may be omitted or other steps may be added. The process of the flowcharts may be implemented, for example, by any of the computers or systems described herein.

In FIG. 7, steps 610 through 640 of FIG. 6 may be performed, as described above, and followed by steps 710 through 730.

At step 710, a plurality of words is selected from the vocabulary using the output word hash vector. For example, all words may be selected whose hash vectors are within a specified Hamming distance from the output word hash vector. In some implementations, an inverted index may be used to select the plurality of words.

At step 720, the plurality of words is added to a search graph. The search graph may be any type of directed graph, such as a directed acyclic graph or a hyper graph. A node may be added to the search graph for each word of the plurality of words, and these added nodes may follow a node for the last word in the sequence of input words. Each node may include a hamming distance between the hash vector of the corresponding word and the output word hash vector. In some implementations, the search graph may be pruned as part of a beam search or graph search algorithm.

At step 730, a natural language processing task is performed using the search graph. For example, any of speech recognition, machine translation, sentence completion, part-of-speech tagging, parsing, handwriting recognition, and information retrieval may be performed using the search graph. In performing the natural language processing task, one or more best scoring paths through the search graph may be selected (e.g., by computing a sum of Hamming distances along the path).

In some implementations, the word hash vectors may be computed at step 610 by a server computer and the word hash vectors may be used by other computing devices, such as another server computer or a user device (e.g., a smartphone). Steps 620 to 660 and 710 to 730 may be performed by the same server computer as 610 or may be performed by other computing devices, such as other server computers or user devices.

Figure 8:
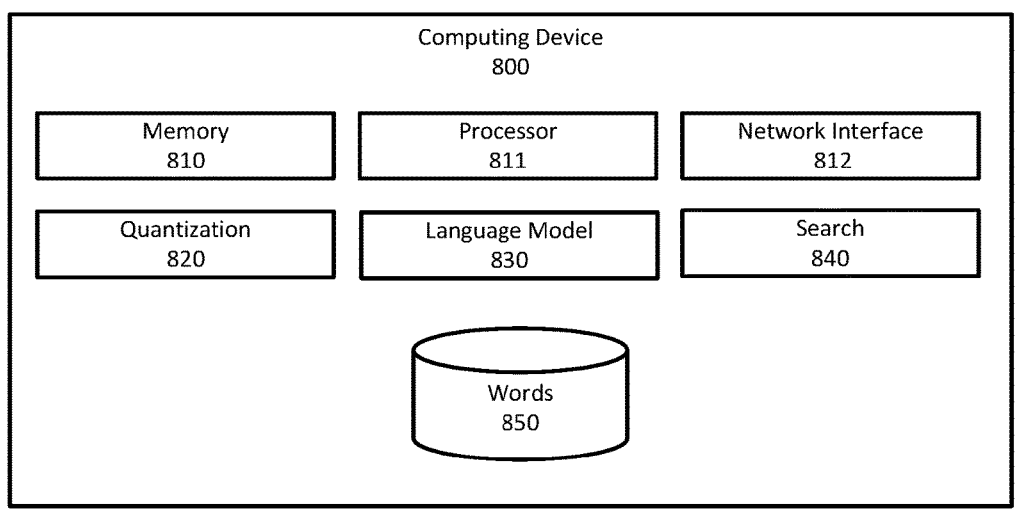
FIG. 8 is an exemplary computing device that may be used to implement language models using hash vectors.

FIG. 8 illustrates components of one implementation of a computing device 800 for implementing any of the techniques described above. In FIG. 8, the components are shown as being on a single computing device 800, but the components may be distributed among multiple computing devices, such as a system of computing devices, including, for example, an end-user computing device (e.g., a smart phone or a tablet) and/or a server computing device (e.g., cloud computing).

Computing device 800 may include any components typical of a computing device, such as volatile or nonvolatile memory 810, one or more processors 811, and one or more network interfaces 812. Computing device 800 may also include any input and output components, such as displays, keyboards, and touch screens. Computing device 800 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 800 may have a quantization component 820 that computes word hash vectors for a vocabulary of words. Computing device 800 may have a language model component 830 that may determine probabilities of sequences of words or identify words that are likely to follow a sequence of words by computing a hash vector. Computing device 800 may have a search component 840 that retrieves words from a data store using a hash vector, such as by using an inverted index.

Computing device 800 may include or have access to various data stores, such as words data store 850. Words data store 850 may include any relevant information about words in a vocabulary, such as the text of the words and hash vectors for the words. Data stores may use any known storage technology, such as files or relational or non-relational databases.

The techniques described above may be combined with any of the techniques described in U.S. patent application Ser. No. 15/254,008 filed on Sep. 1, 2016, and U.S. patent application Ser. No. 15/383,603 filed on the same day as this application with title Suggesting Resources using Context Hashing and with attorney docket number ASAP-0002-U01, each of which is herein incorporated by reference in its entirety for all purposes. For example, any of the techniques described herein may be provided as part of a third-party semantic processing service whereby a third party provides semantic processing services to a company to assist the company in providing customer service to its customers.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application.

By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for selecting a word, the method comprising:
computing, by a server, a word hash vector for each word of a vocabulary;
obtaining the word hash vector for each word of the vocabulary;
receiving a first sequence of words;
generating a first sequence of word hash vectors by obtaining a word hash vector for each word of the first sequence of words;
processing the first sequence of word hash vectors with a layer of a neural network language model to compute a first output vector;
quantizing the first output vector to obtain a first output word hash vector;
determining a distance between the first output word hash vector and a first hash vector for a first word in the vocabulary;
selecting the first word from the vocabulary using the distance between the first output word hash vector and the first hash vector for the first word;

generating a second sequence of words using the first sequence of words and the first word;
generating a second sequence of word hash vectors by obtaining a word hash vector for each word of the second sequence of words;
processing the second sequence of word hash vectors with the layer of the neural network language model to compute a second output vector;
quantizing the second output vector to obtain a second output word hash vector;
determining a distance between the second output word hash vector and a second hash vector of a second word in the vocabulary; and
selecting the second word from the vocabulary using the distance between the second output word hash vector and the second hash vector for the second word.

2. The computer-implemented method of claim 1, comprising using the first word to perform speech recognition, machine translation, sentence completion, part-of-speech tagging, parsing, handwriting recognition, or information retrieval.

3. The computer-implemented method of claim 1, wherein quantizing the first output vector comprises performing multi-class logistic regression.

4. The computer-implemented method of claim 1, wherein the layer of the neural network language model corresponds to a fixed-size language model.

5. The computer-implemented method of claim 1, wherein each element of the first output word hash vector comprises a boolean value.

6. The computer-implemented method of claim 1, wherein the first output word hash vector is equal to the first hash vector for the first word.

7. The computer-implemented method of claim 1, wherein the distance is a Hamming distance.

8. The computer-implemented method of claim 1, wherein selecting the first word comprises using an inverted index.

9. A system for selecting a word, the system comprising:
at least one computer comprising at least one processor and at least one memory, the at least one computer configured to:
compute a word hash vector for each word of a vocabulary of words;
receive a sequence of words;
generating a sequence of word hash vectors by obtaining a word hash vector for each word of the sequence of words;
process the sequence of word hash vectors with a layer of a language model to compute an output vector;
quantize the output vector to obtain an output word hash vector; determine a distance between the output word hash vector and a first hash vector for a first word in the vocabulary; and
select the first word from the vocabulary using the distance between the output word hash vector and the first hash vector for the first word.

10. The system of claim 9, wherein the at least one computer is configured to:
compute a word embedding for each word of the vocabulary of words; and
compute the word hash vector for a word using the word embedding for the word.

11. The system of claim 9, wherein the at least one computer is configured to:
select a plurality of words from the vocabulary using the output word hash vector; and
add the plurality of words to a search graph.

12. The system of claim 11, wherein the at least one computer is configured to:
prune the search graph; and
select one or more best scoring paths through the search graph.

13. The system of claim 12, wherein the at least one computer is configured to perform speech recognition, machine translation, sentence completion, part-of-speech tagging, parsing, handwriting recognition, or information retrieval using the one or more best scoring paths.

14. The system of claim 9, wherein the at least one computer is configured to quantize the output vector using a linear kernel support vector machine.

15. The system of claim 9, wherein the layer of the language model comprises a recursive language model.

16. The system of claim 9, wherein the at least one computer is configured to compute a word hash vector by performing a rotation of a word embedding.

17. One or more non-transitory computer-readable media comprising computer executable instructions that, when executed, cause at least one processor to perform actions comprising:
computing a word hash vector for each word of a vocabulary;
receiving a sequence of words;
generating a sequence of word hash vectors by obtaining a word hash vector for each word of the sequence of words;
processing the sequence of word hash vectors with a layer of a language model to compute an output vector;
quantizing the output vector to obtain an output word hash vector;
determining a distance between the output word hash vector and a first hash vector for a first word in the vocabulary; and
selecting the first word from the vocabulary using the output word hash vector and a first hash vector for the first word.

18. The one or more non-transitory computer-readable media of claim 17, wherein the layer of the language model comprises a recurrent neural network with long short-term memory units.

19. The one or more non-transitory computer-readable media of claim 17, wherein each element of the output word hash vector comprises a boolean value.

20. The one or more non-transitory computer-readable media of claim 17, wherein the distance is a Hamming distance.

* * * * *

UNITED STATES PATENT AND TRADEMARK OFFICE
CERTIFICATE OF CORRECTION

PATENT NO. : 10,109,275 B2
APPLICATION NO. : 15/383707
DATED : October 23, 2018
INVENTOR(S) : Shawn Henry Page 1 of 1

It is certified that error appears in the above-identified patent and that said Letters Patent is hereby corrected as shown below:

In the Specification

Column 4, Line 31, delete "Vis" and insert -- V is --, therefor.

Column 7, Lines 52-56, after "$v = \dfrac{\operatorname{sign}\left(W\begin{bmatrix} v_1 \\ \vdots \\ v_N \end{bmatrix}\right) + 1}{2}$" insert -- . --.

Column 10, Line 19, delete "used," and insert -- used. --, therefor.

Column 12, Line 32, after "2016," insert -- now issued as U.S. Patent No. 9,715,496 on Jul. 25, 2017, --.

Column 12, Lines 33-35, delete "15/383,603 filed on the same day as this application with title Suggesting Resources using Context Hashing and with attorney docket number ASAP-0002-U01," and insert -- 15/383,603, filed on Dec. 19, 2016 and entitled "SUGGESTING RESOURCES USING CONTEXT HASHING", --, therefor.

Signed and Sealed this
Second Day of June, 2020

Andrei Iancu
*Director of the United States Patent and Trademark Office*